CROSS REFERENCE EXAMINER
250-203.CT 56 37

March 28, 1961 D. J. PARKER 2,976,758

PROTECTIVE SYSTEM AGAINST DAMAGING RAYS

Filed Jan. 2, 1957 3 Sheets-Sheet 1

INVENTOR.
DONALD J. PARKER
BY J. C. Whittaker
ATTORNEY

Sec 250-83.3IR

PROTECTIVE SYSTEM AGAINST DAMAGING RAYS

Filed Jan. 2, 1957 3 Sheets-Sheet 2

INVENTOR.
DONALD J. PARKER
BY
J. C. Whittaker
ATTORNEY

March 28, 1961 D. J. PARKER 2,976,758

PROTECTIVE SYSTEM AGAINST DAMAGING RAYS

Filed Jan. 2, 1957 3 Sheets-Sheet 3

INVENTOR.
DONALD J. PARKER
BY
J. L. Whittaker
ATTORNEY

United States Patent Office 2,976,758

Patented Mar. 28, 1961

2,976,758

PROTECTIVE SYSTEM AGAINST DAMAGING RAYS

Donald J. Parker, Camden, N.J., assignor to Radio Corporation of America, a corporation of Delaware Filed Jan. 2, 1957, Ser. No. 632,199

6 Claims. (Cl. 88—1)

This invention relates to an improved protective system for a film camera, television camera or the like.

An object of this invention is to allow surveillance of a scene (visually, photographically or by means of a television camera) in which there is a bright object such as the sun, without blinding the observer, in the case of visual observation, fogging or scorching the film, in the case of photographic observation, or "burning" the television pickup tubes, in the case of television observation.

According to the invention, an opaque occulting disc, slightly larger in size than the image of the bright object, is initially positioned to mask the image, and thereby to prevent the image from reaching and possibly damaging the image receiving means (camera or the like). In a specific form of the invention, the occulting disc is located in an image plane between the main objective lens of the optical system and the eye (in the case of visual observation) or light sensitive surface (in the case of visual or photographic observation). When the position of the bright image changes relative to the disc, the latter is driven in a sense and amount such that it continues to mask the image of the object. In one form of the invention, movement of the bright image relative to the disc is sensed by a photocell circuit, and the electrical output of the circuit is used to drive servo motors which correct the disc position.

The invention will be described in greater detail by reference to the following description taken in connection with the accompanying drawing in which.

Throughout the figures, similar reference numerals are applied to similar elements.

Figure 1:
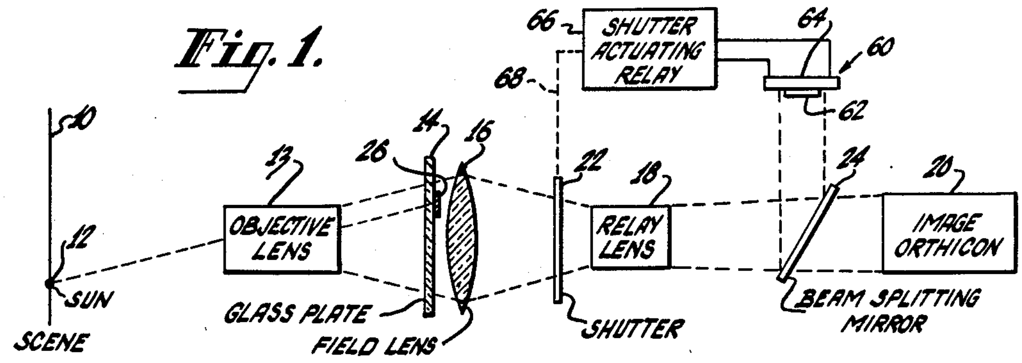
Figure 1 is a block and schematic diagram of a form of the present invention.

Referring to Figure 1, the scene to be surveyed by the system of this invention is indicated by a single line 10. In the scene is a bright object such as the sun 12. The scene is imaged by objective lens 13 at an intermediate image plane, in which plane glass plate 14 is located. Relay lens 18 projects the final scene image onto the image orthicon 20. Field lens 16 prevents "vignetting" of the off axis image points. A shutter 22, the function of which will be explained in greater detail later, is located between field lens 16 and relay lens 18. A beam splitting mirror 24 is located between the relay lens and the image orthicon. Its function will also be explained later.

If no precautions were taken when viewing the scene shown in Figure 1, the intense sun image projected onto the pickup tubes of the image orthicon might permanently damage these tubes. According to the present invention, the glass plate positioned between the objective lens 12 and field lens 16 has an opaque occulting disc 26, which is slightly larger in size than the image to be masked, formed on one of its surfaces. Means, to be described below, are provided for initially positioning the glass plate to a position such that the disc masks the sun image. However, as the location of the sun relative to the occulting disc changes due, for example, to the earth's rotation or to a change in the attitude of the vehicle carrying the television camera, it is necessary that the location of the disc also be changed, and in a sense and amount such that it continues to coincide with the sun image. One means for accomplishing this is shown in Figures 2, 3 and 4.

Figure 2:
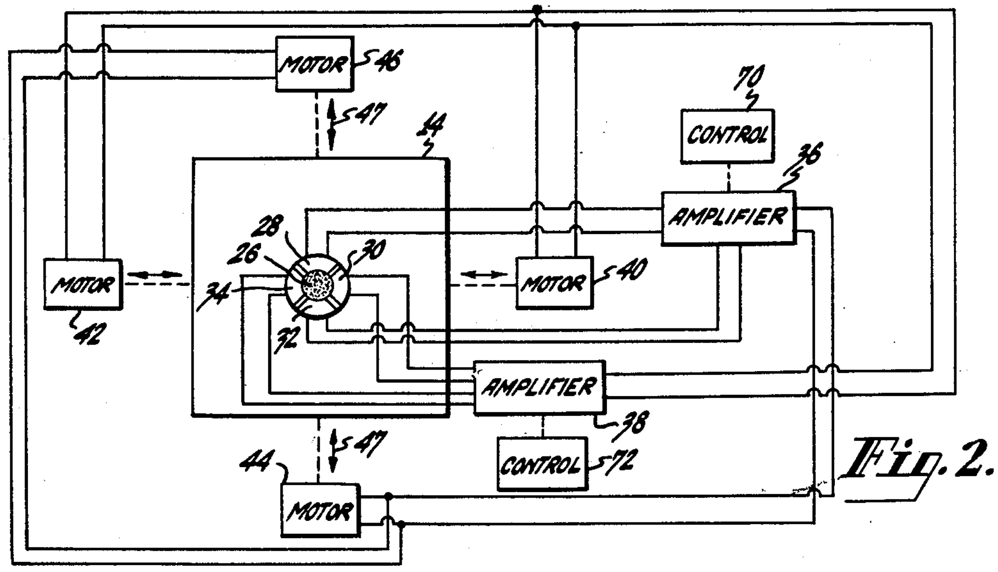
Figures 2, 3 and 4 are diagrams of the occulting disc driving arrangement of Figure 1.
Figures 3, 4, 6:
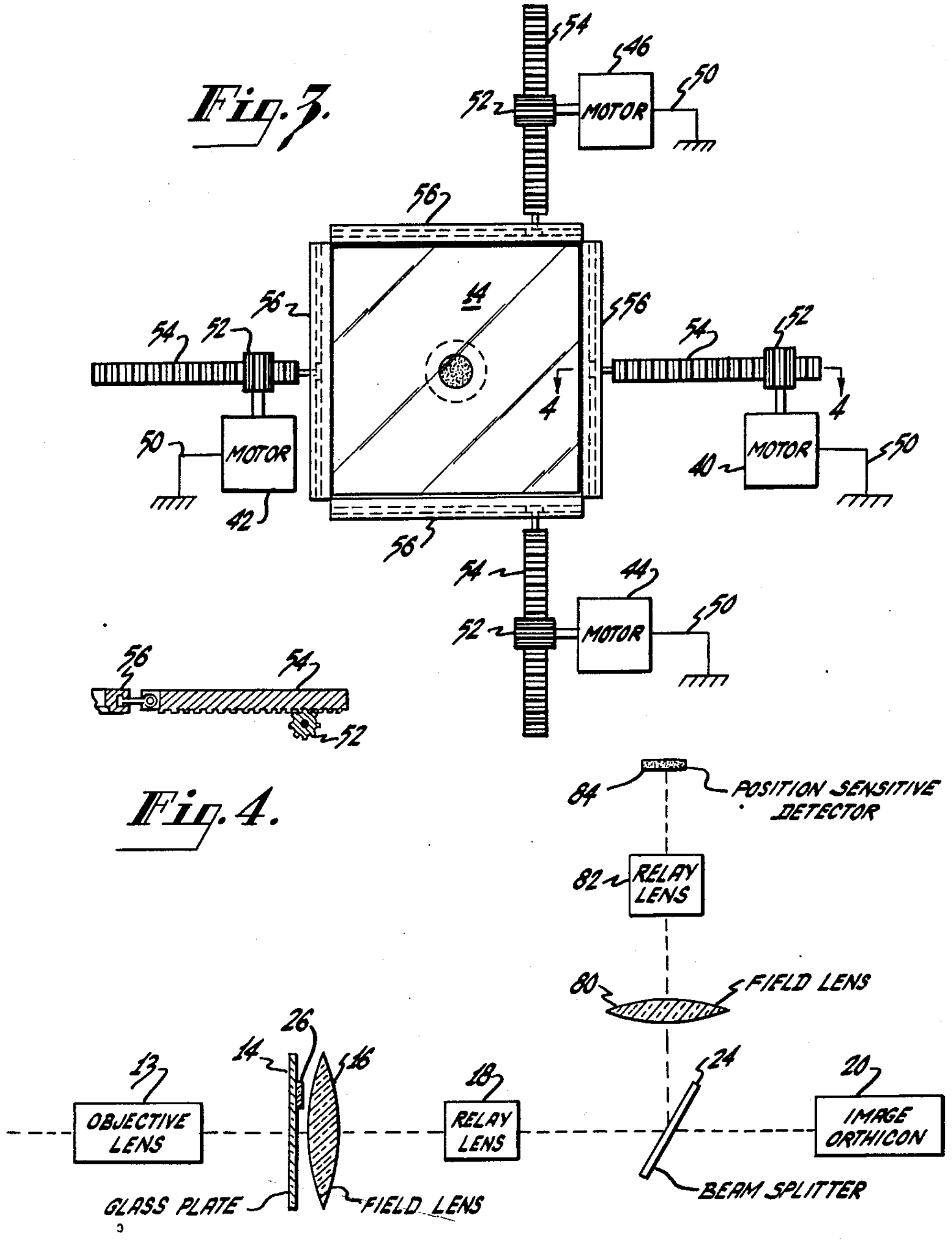
Figure 6 is a block diagram of a fully automatic system according to this invention.

Referring to Figure 2, the transparent glass plate is shown at 14, and the opaque occulting disc at 26. Four light sensitive elements 28, 30, 32 and 34 are symmetrically spaced about the disc circumference. The elements are electrically insulated from one another. Elements 28 and 32 are electrically connected to servo amplifier 36, and elements 30 and 34 are electrically connected to servo amplifier 38.

When the disc is centered on the sun image, there is no current induced in any of the light sensitive elements. However, when the sun image moves relative to the disc, a current is induced in one or more of the light sensitive elements. This causes the amplifier or amplifiers connected to the element or elements to produce an output current at a power level sufficient to drive the servo motors to which they are connected. Amplifier 36 drives motors 44 and 46, and amplifier 38 drives motors 40 and 42. The motors, in turn, are mechanically coupled to the glass plate and drive the plate in a direction and amount such that the disc again masks the sun image, and the photocurrent output of the light sensitive elements is again reduced to zero.

As an example of how the system operates, assume that the sun moves to a position such that only photocell 30 is actuated. This causes a current to be applied to amplifier 38. The connection of the amplifier to motors 40 and 42 is such that the motors drive the glass plate to the right, as viewed in the drawing, in the correct amount again to center the disc on the sun. If photocell 34 is actuated, the photocurrent fed to amplifier 38 is of a polarity such that motors 40 and 42 drive the glass plate to the left, as viewed in the drawing. Photocells 28 and 32, amplifier 36 and motors 44 and 46 control the movement of glass plate 14 in the direction of arrows 47, in a similar manner.

One type of driving arrangement which may be employed in the system of this invention is shown in greater detail in Figure 3. The motors 40, 42, 44 and 46 are permanently connected to a supporting frame, as indicated by symbols 50. Connected to the motor shafts are pinions 52 which drive gear racks 54. Glass plate 14 has slide rails 56 at its four edges. Each rail is fixed to the plate and slidably engaged by a gear rack 54.

In operation, when motors 40 and 42 drive, the glass plate moves to the left or right, and the upper and lower slide rails move with respect to the upper and lower gear racks 54. In the same manner, when the motors 44 and 46 drive, the glass plate moves up or down, as viewed in the figure, and the right and left slide rails 56 move with respect to the left and right gear racks 54. The slide rails may be slidably connected to the frame in which the glass plate is mounted to prevent tilting of the glass plate at the extremes of its directions of travel. These mountings are not shown in the figure.

Figure 4 is a section along line 4—4 of Figure 3 and shows further detail of the driving arrangement.

The photosensitive elements shown in Figure 2 may be formed of cadmium sulfide or a similar material. The leads from the light sensitive element are preferably transparent so as not to affect the image passing to the image orthicon.

In the event that the sun leaves the field of view and later returns, or a similarly bright object enters the field of view, it is necessary that the pickup tube be protected from exposure until the tracking disc is again centered on the sun. This protection is achieved by the shutter arrangement shown in Figure 1.

Referring again to Figure 1, beam splitting mirror 24 is positioned between relay lens 18 and the image orthicon 20. The mirror reflects a small portion of the incident light, and an image of the scene is projected onto member 60. The latter consists of an opaque mask 62 on a photocell 64. Mask 62 has dimensions which are equivalent to the used portion of the image orthicon sensitive surface. When the sun image closely approaches the field of view of the image orthicon, it is projected by mirror 24 onto the unmasked portion of the photocell 64. The photocurrent generated in response to the sun image is of sufficient amplitude to actuate the shutter relay 66. The relay, in turn, closes the shutter and prevents light from passing through the lens to the image orthicon.

In operation of the system of the invention as described so far, the shutter 22 is initially in front of the relay lens. The glass plate is then positioned to make the occulting disc 26 coincide with the sun image. The plate may be manually positioned by switches or other control means in circuit with amplifiers 36 and 38. These are indicated schematically by blocks 70 and 72 in Figure 2. The shutter is then opened (removed from in front of the relay lens 18), and the system thereafter automatically retains the occulting disc 28 over the sun image.

Figure 5:
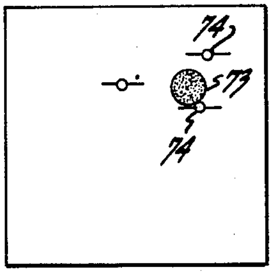
Figure 5 is a drawing of a typical television display as seen by the image orthicon of Figure 1.

A typical television picture, as viewed with the system of Figure 1, is shown in Figure 5. The sun image is masked by the opaque occulting disc 26. This appears on the television display as a black mark 73. Aircraft 74, which would normally be obliterated by the intense sun image, is readily observable.

In the system described above, the occulting disc must initially be manually positioned over the bright image and then the servo system automatically continues to maintain the disc over the image. In addition, if the sun should enter the field of view, a shutter is actuated and this must be manually reset before the automatic tracking can begin again. The manual adjustments are entirely eliminated in the embodiments of the invention illustrated in Figures 6–9.

Referring to Figure 6, elements 13, 14, 16, 18, 20 and 24 may be identical to the like numbered elements of the embodiment of Figure 1. As in the case of the embodiment of Figure 1, block 20 may be an image orthicon, a telescope, a camera or other similar means, generally referred to as an image receiving means. A small portion of the light which impinges on beam splitter mirror 24 is reflected through a second optical system onto a position sensitive detector. The optical system includes a field lens 80 and relay lens 82 which serve purposes similar to the corresponding elements 16 and 18. Further, the optical system reduces the image of the field of view of the image orthicon to a size suitable for projection onto the position sensitive detector 84. The position sensitive detector comprises a photocell which produces output currents indicative of the position on the photocell of the bright image projected thereon.

Figure 7:
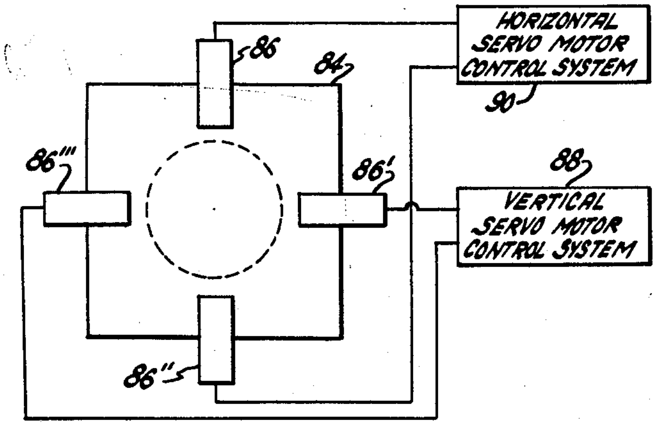
Figure 7 shows a portion of the system of Figure 6 in greater detail.

The photocell is shown in greater detail in Figure 7. It includes a semiconductor body having one or more junctions (interfaces between regions of different impurity concentrations or regions of different conductivity type) and four spaced electrodes 86, 86', 86'' and 86''' in contact with the body. When an intense light spot is focused onto the photocell, an output voltage may be developed across terminals 86, 86'' and/or terminals 86', 86''' according to the position of the light spot on the photocell. If the light spot is focused at the center of the photocell, no output voltages are developed, but when the light spot is displaced from its center position, output voltages are developed which have values dependent on the direction and extent of the displacement of the spot from the center of the photocell. This photocell is described in detail in application Serial No. 606,149, filed August 24, 1956, by J. T. Wallmark, and assigned to the assignee of the present application.

The output photocurrents of photocell 84 are applied to the servo system shown in greater detail in Figure 2. In Figure 7, motors 46 and 44, and amplifier 36, which drives the motors are indicated by a single block 88, and motors 40 and 42, and amplifier 38 which drives the motors are indicated by a single block 90.

In operation, when the sun enters the field of view, its position is sensed by the position sensitive detector. The output voltages developed are applied to the servo system and drive the glass plate and occulting disc 26 to a position such that the disc masks the sun image. At this time, the sun image no longer reaches the position sensitive detector and the servo system stops driving. The bias on the amplifiers in blocks 80 and 90 is adjusted to a value such that the amplifiers do not respond to photocurrents induced by other images in the field of view such as aircraft or the background light.

Note that in the arrangement of Figure 6, no shutter is required. Moreover, the occulting disc need not be manually positioned initially. Finally, should the sun pass behind a cloud and later reappear, the system automatically senses the new position of the sun, and automatically drives the disc over the new position of the sun.

With the arrangement of Figure 6, the photocell surrounding the occulting disc may be eliminated. However, in a preferred form of the invention they are retained and take over the tracking function after the system including detector 84 drives the disc over the sun image.

Figure 8:
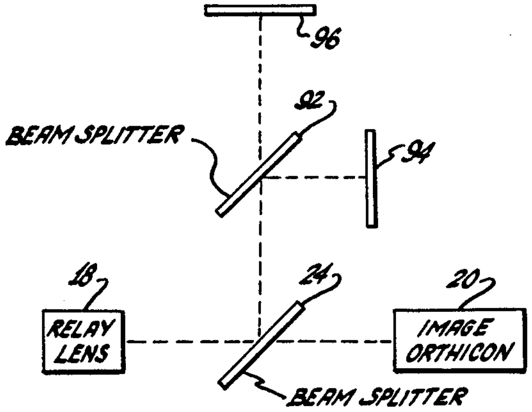
Figure 8 is a diagram of a portion of another automatic system according to this invention.

An arrangement analogous to the one shown in Figure 6 is illustrated in Figure 8. Again, the portion of the system including relay lens 18, beam splitter 24 and image orthicon 20 is the same as the corresponding portion of the system of Figure 1. Only the three enumerated items are shown in Figure 8. The beam splitting mirror 24 reflects a small portion of the scene onto a second beam splitting mirror 92. The latter mirror reflects one-half of the light it receives to position sensitive detector 94 and passes the remainder of the light to position sensitive detector 96.

Figure 9:
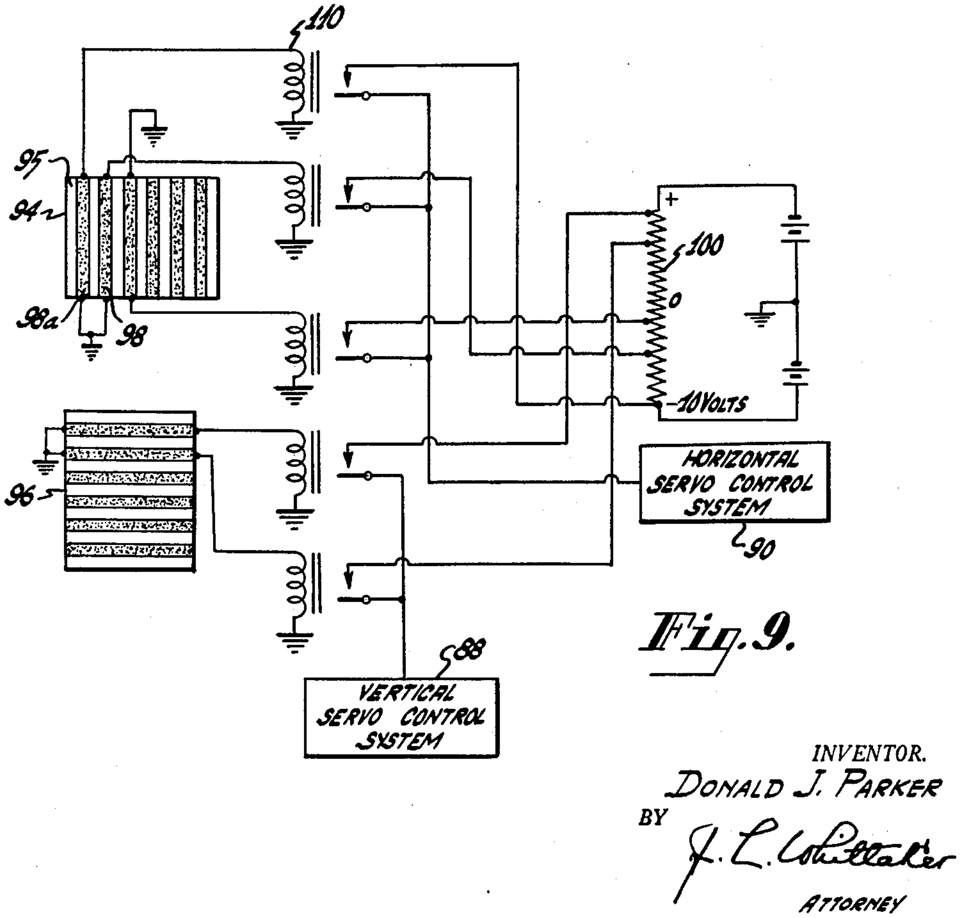
Figure 9 is a block and schematic circuit diagram of a portion of the system of Figure 8.

The detectors are shown in greater detail in Figure 9. Detector 94 consists of a transparent member 95 on which are positioned a plurality of vertical, elongated photocells 98. Position sensitive detector 96 is similar to 94 except that the photocells are arranged horizontally. Element 94 senses horizontal movement of the spot of light (as viewed in the figure) and element 96 senses vertical movement of the spot of light (as viewed in the figure). The photocurrent outputs of successive ones of the cells are used to actuate relays, there being one relay associated with each cell. The relay contacts, which are normally open, are connected to spaced points along a voltage divider network 100.

In operation, assume that the sun image enters the field of view from the left as viewed in Figure 9. The first photocell that it strikes is cell 98*a*. The photocurrent induced in the photocell actuates relay 110 which connects a negative value of voltage (of an arbitrarily assigned value of −10 volts) to the horizontal servo control system 90. The voltage applied to the servo system is of a magnitude sufficient to drive the occulting disc to the horizontal coordinate of the sun image. In the same manner, the photocurrents induced in position sensitive detector 96 are employed to control the voltages applied to the vertical servo control system 88 and drive the occulting disc to the vertical coordinate of the sun image.

What is claimed is:

1. In a system in which a scene projected by an optical system onto an image receiving surface includes a high intensity image, in combination, a support with respect to which said image receiving means remains fixed; a movable masking means in the optical system having an area slightly larger than that of said high intensity image; means for initially positioning the masking means over said high intensity image and thereby preventing said high intensity image from reaching the image receiving surface; means including photocell means for producing output currents in response to movement of said high intensity image relative to the masking means; and driving means fixed to said support and responsive to said currents for driving said masking means with respect to said support and said image receiving surface in the correct sense and amount to reduce said currents to zero.

2. In the system as set forth in claim 1, said driving means including servo motors.

3. In a system in which a scene projected by an optical system onto an image receiving surface includes a high intensity image, in combination, a support with respect to which said image receiving surface remains fixed; a movable masking means in the optical system having an area slightly larger than that of said high intensity image; means for initially positioning the masking means over said high intensity image and thereby preventing the same from reaching the image receiving surface; means including photocell means for producing output currents in response to movement of the high intensity image relative to the masking means; driving means responsive to said currents for driving said masking means with respect to said support and said image receiving surface in the correct sense and amount to reduce said currents to zero; and automatic shutter means connected to be actuated when a high intensity image enters an edge of the scene viewed by the optical system for preventing the optical system from projecting the last-named image onto said image receiving surface.

4. In a system for optically projecting a scene having a high intensity image onto an image receiving surface, in combination, an objective lens; a movable transparent plate formed with an opaque mask on one surface thereof slightly larger in size than said high intensity image as projected by the objective lens onto the plate; a field lens; a relay lens; a partially reflecting mirror; and an image receiving surface, said above-named elements being arranged in the order named for projecting the scene image through the objective lens, transparent plate, field lens, relay lens and partially reflecting mirror onto said image receiving surface; a light responsive detector system for sensing the high intensity image when the latter is not masked by the opaque mask, and producing an output signal having a sense and magnitude which are functions of the direction and extent of the lack of correspondence between the opaque mask and the high intensity image; and a servo system coupled between said detector system and said transparent plate and responsive to said output signal for moving said transparent plate in a sense and amount sufficient always to maintain the masking means over the high intensity image.

5. In a system for optically projecting a scene having a high intensity image onto an image receiving surface, in combination, an objective lens; a movable transparent plate formed with an opaque mask on one surface thereof slightly larger in size than said high intensity image, as projected by the objective lens onto the plate; a field lens; a relay lens; a partially reflecting mirror; and an image receiving surface, said above-named elements being arranged in the order named for projecting the scene image through the objective lens, transparent plate, field lens, relay lens and partially reflecting mirror onto said image receiving surface; a light responsive detector system for sensing the high intensity image when the latter is not masked by the opaque mask, and producing an output signal having a sense and magnitude which are functions of the direction and extent of the lack of correspondence between the opaque mask and the high intensity image, said light responsive detector system including a plurality of photocells arranged around the peripheral edge of the opaque mask; and a servo system coupled between said detector system and said transparent plate and responsive to said output signal for moving said transparent plate in a sense and amount sufficient always to maintain the masking means over the high intensity image.

6. In a system for optically projecting a scene having a high intensity image onto an image receiving surface, in combination, an objective lens; a movable transparent plate formed with an opaque mask on one surface thereof slightly larger in size than said high intensity image, as projected by the objective lens onto the plate; a field lens, a relay lens; a partially reflecting mirror; and an image receiving surface, said above-named elements being arranged in the order named for projecting the scene image through the objective lens, transparent plate, field lens, relay lens and partially reflecting mirror onto said image receiving surface; a light responsive detector system for sensing the high intensity image when the latter is not masked by the opaque mask, and producing an output signal having a sense and magnitude which are functions of the direction and extent of the lack of correspondence between the opaque mask and the high intensity image, said light responsive detector system including a position sensitive light responsive element, and an optical system operatively associated with the partially reflecting mirror and said element for focusing the light reflected from the mirror onto said element; and a servo system coupled between said detector system and said transparent plate and responsive to said output signal for moving said transparent plate in a sense and amount sufficient to maintain the masking means over the high intensity image.

References Cited in the file of this patent

UNITED STATES PATENTS

| | | |
|---|---|---|
| 548,868 | Drew | Oct. 29, 1895 |
| 2,379,153 | Holste | June 26, 1945 |
| 2,527,436 | Masterson | Oct. 24, 1950 |
| 2,563,892 | Waller et al. | Aug. 14, 1951 |
| 2,604,601 | Menzel | July 22, 1952 |

OTHER REFERENCES

"Photometry of the Solar Aureole," Journal of the Optical Society of America, vol. 46, page 1031, December 1956.